(12) United States Patent
Blue

(10) Patent No.: US 8,590,733 B1
(45) Date of Patent: Nov. 26, 2013

(54) FILTER HOUSING WITH LIFTABLE LID

(76) Inventor: Mark Blue, Angola, IN (US)

(*) Notice: Subject to any disclaimer, the term of this patent is extended or adjusted under 35 U.S.C. 154(b) by 223 days.

(21) Appl. No.: 13/078,448

(22) Filed: Apr. 1, 2011

Related U.S. Application Data

(60) Provisional application No. 61/320,124, filed on Apr. 1, 2010.

(51) Int. Cl.
*B65D 43/18* (2006.01)

(52) U.S. Cl.
USPC ........... 220/813; 220/810; 220/262; 220/291; 220/820; 220/212.5

(58) Field of Classification Search
USPC ......... 220/810, 811, 813, 820, 291, 260, 262, 220/212, 212.5
See application file for complete search history.

(56) References Cited

U.S. PATENT DOCUMENTS

| | | | |
|---|---|---|---|
| 1,028,499 A * | 6/1912 | Schott | 220/816 |
| 2,179,906 A * | 11/1939 | Thompson | 220/291 |
| 2,665,868 A | 4/1952 | Schmidt | |
| 3,347,507 A | 10/1967 | Dyer | |
| 4,165,013 A | 8/1979 | Lutz | |
| 4,355,597 A * | 10/1982 | Blasbalg | 119/57.8 |
| 5,518,134 A * | 5/1996 | Liu | 220/816 |
| 6,085,935 A * | 7/2000 | Malchow et al. | 220/813 |

* cited by examiner

*Primary Examiner* — Anthony Stashick
*Assistant Examiner* — James N Smalley
(74) *Attorney, Agent, or Firm* — Botkin & Hall, LLP

(57) ABSTRACT

A filter housing having a lid that mates with the vessel portion. An arm with an inclined feature is secured to the lid and is movable with respect to the vessel portion. A rotational member that is rotatable with respect to the vessel portion engages the inclined feature. The rotational member is restrained from longitudinal movement so that rotation of it causes movement of the arm with respect to the vessel portion and therefore, moves the lid with respect to the vessel portion so that the lid may be separated from the vessel portion.

4 Claims, 7 Drawing Sheets

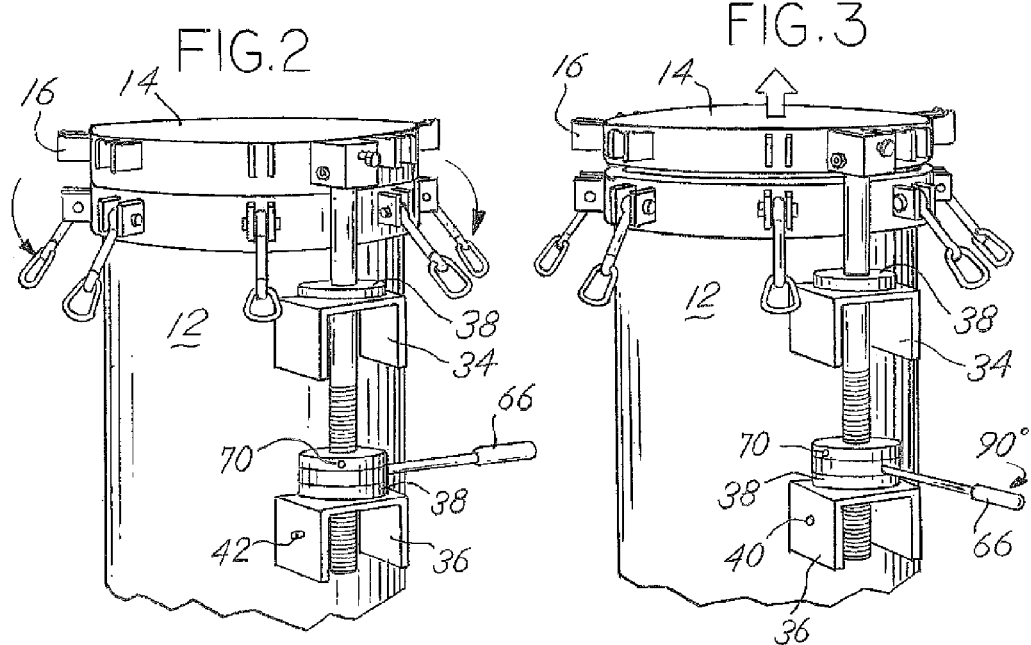
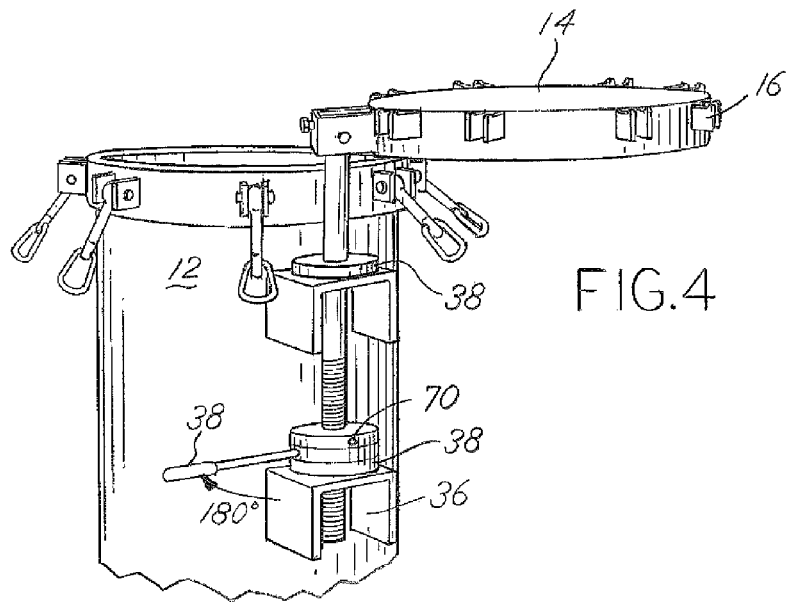

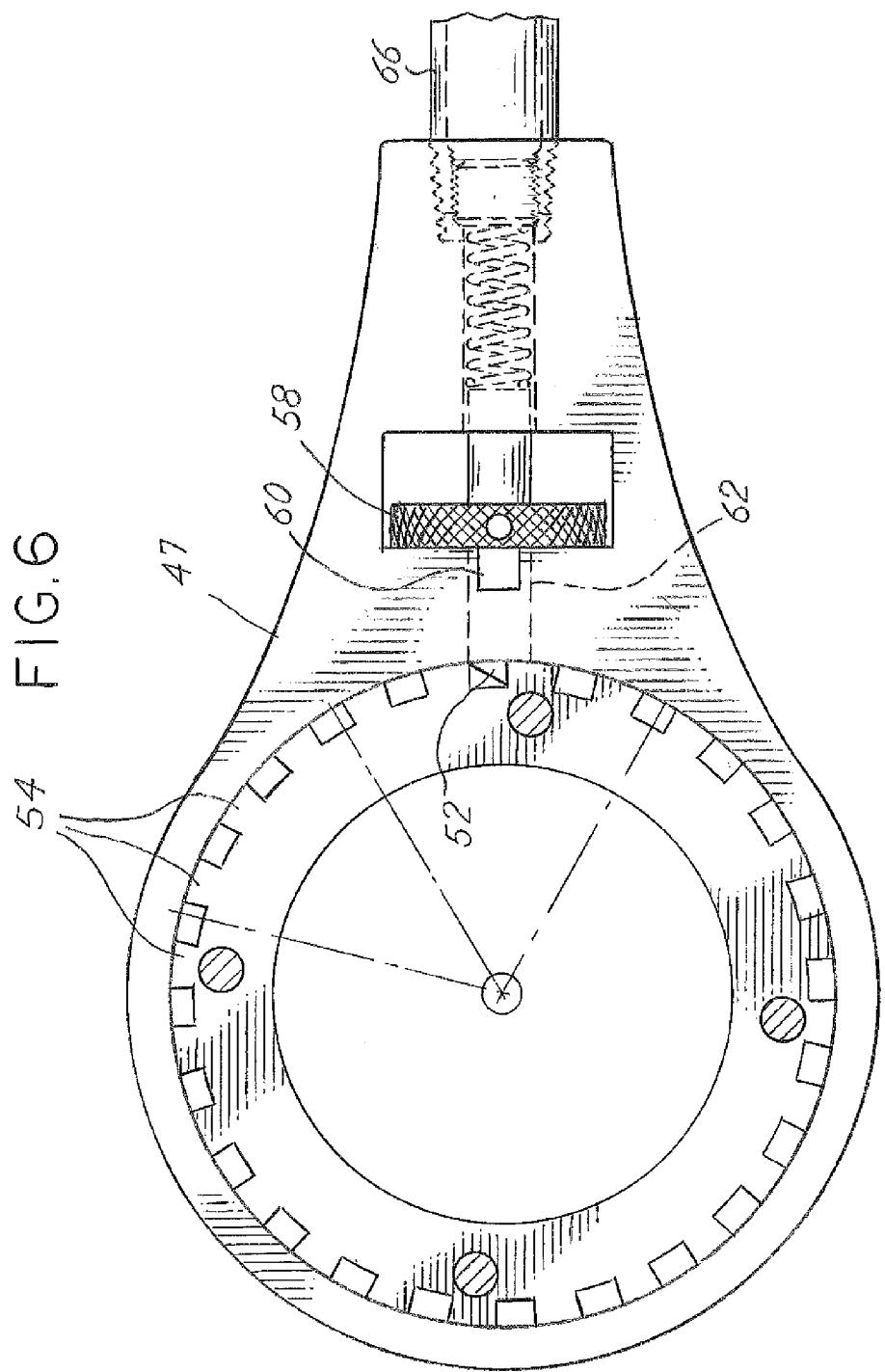

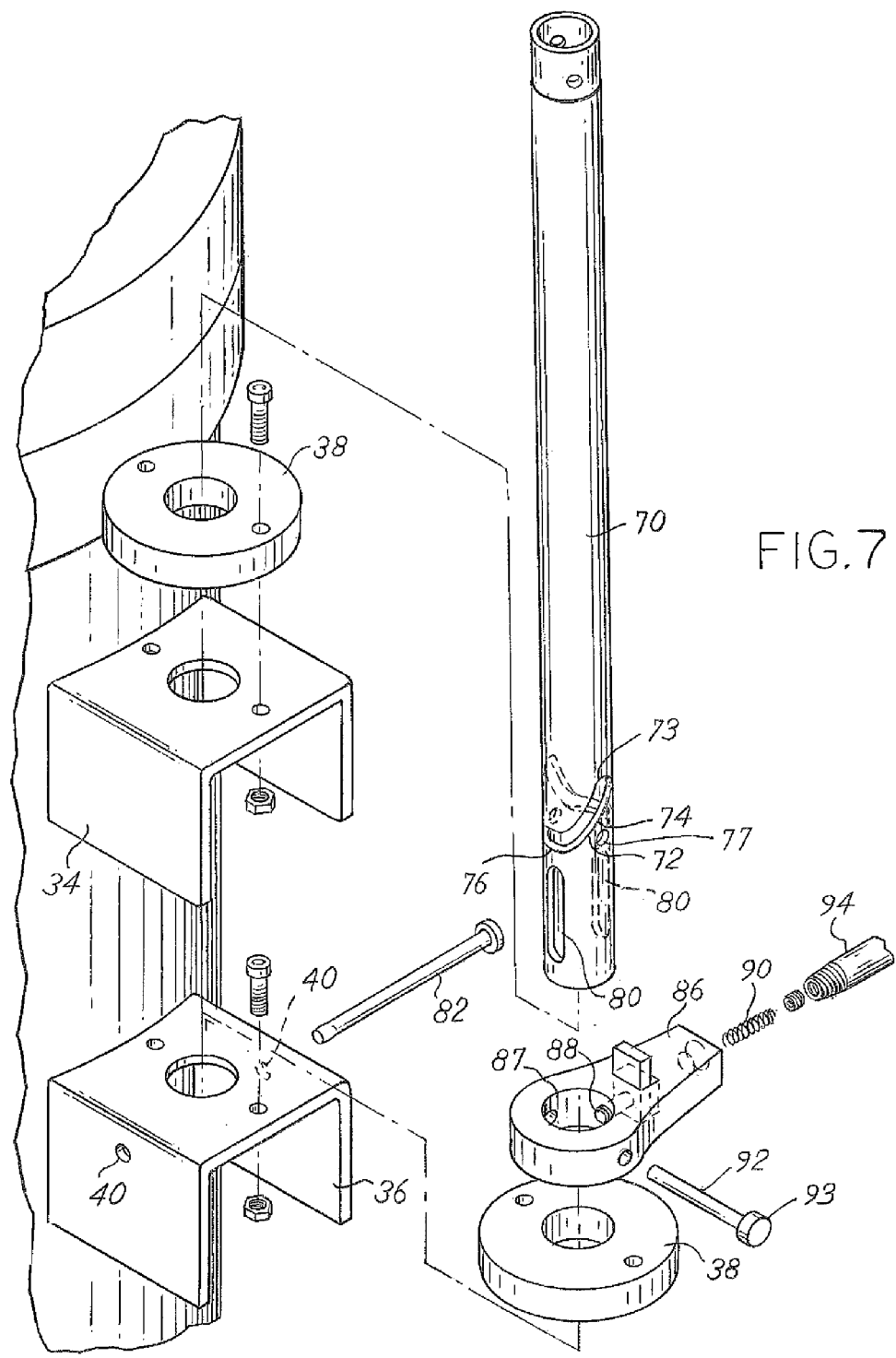

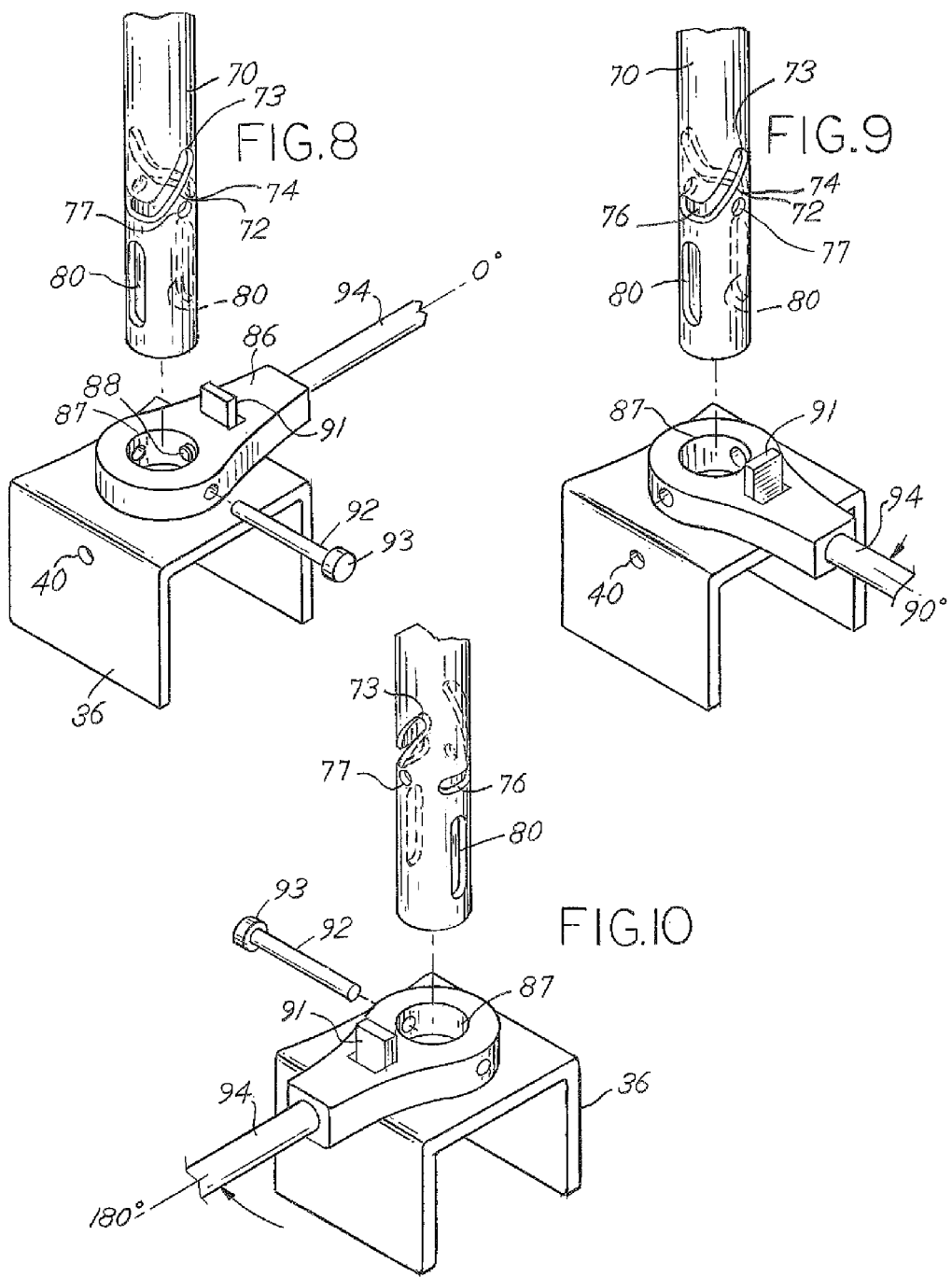

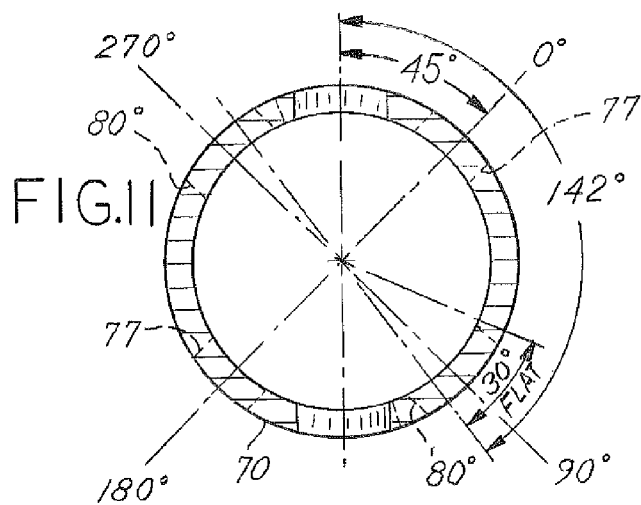
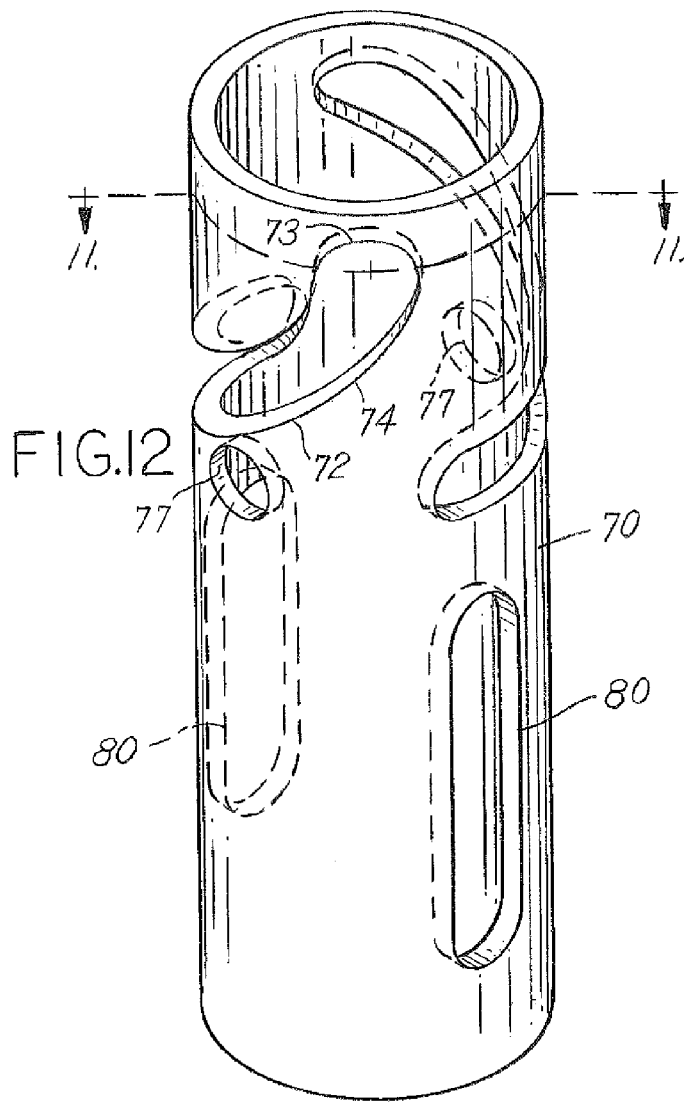

FILTER HOUSING WITH LIFTABLE LID

CROSS REFERENCE TO RELATED APPLICATIONS

This application claims the benefit of U.S. Provisional Application No. 61/320,124, filed Apr. 1, 2010, the disclosure of which is hereby incorporated by reference.

BACKGROUND

Large volume filtration vessels are very useful for filtering large amounts of fluid and, due to high pressures within such a vessel, the parts can be quite heavy. The heft of the parts can make changing individual filter elements within the vessel very difficult. Often, a lid or other cover must be lifted to reveal the individual elements within a filter vessel. The cover may be hundreds of pounds and, due to size, be quite awkward. Some large filter vessels may employ external means to lift the cover from the vessel such as an external crane. However, it is desirable to have an integrated system that allows for easy removal of the cover that is incorporated into the filter vessel itself.

SUMMARY OF THE INVENTION

The present invention relates to a filter housing. The filter housing has a vessel portion and a lid which mates with the vessel portion. An arm is secured to the lid and is movable with respect to the vessel portion. The arm has an inclined feature. A rotational member engages the inclined feature. The rotational member is rotatable with respect to the vessel portion and restrained from longitudinal movement with respect to the vessel portion so that rotation of the rotational member relative to the arm causes longitudinal movement of the arm and separation of the lid from the vessel portion.

In one aspect of the invention, the inclined feature on the arm may be threads. In this case, threads on the rotational member mate with the threads on the arm.

In another aspect of the invention, the inclined feature on the arm may be inclined slots. In this case a pin engages at least one slot.

BRIEF DESCRIPTION OF THE DRAWINGS

FIG. 2 is a perspective view of the filter housing shown in FIG. 1 with the lid in the lowered position;

FIG. 3 is a perspective view of the filter housing shown in FIGS. 1 and 2 with the lid in a raised position, and the lid not being turned with respect to the vessel portion of the housing;

FIG. 4 is a perspective view of the filter housing shown in FIGS. 1-3 with the lid in a raised position, and the lid being turned with respect to the vessel portion of the housing;

FIG. 6 is a top view of the ratchet housing and ratchet gear;

FIG. 7 is an exploded perspective view of another embodiment of the filter housing;

FIG. 8 is an exploded perspective view of the filter housing shown in FIG. 7 with the handle of the rotational member in the same position as in FIG. 7, which corresponds to the zero degree position;

FIG. 9 is an exploded perspective view of the filter housing shown in FIGS. 7 and 8 with the handle in the ninety degree position;

FIG. 10 is an exploded perspective view of the filter housing shown in FIGS. 7-9 with the handle in the 180 degree position;

FIG. 11 is a sectional view of the arm taken about line 11-11 in FIG. 12; and

FIG. 12 is a perspective view of the arm shown in FIG. 11.

DETAILED DESCRIPTION OF INVENTION

Figure 1:
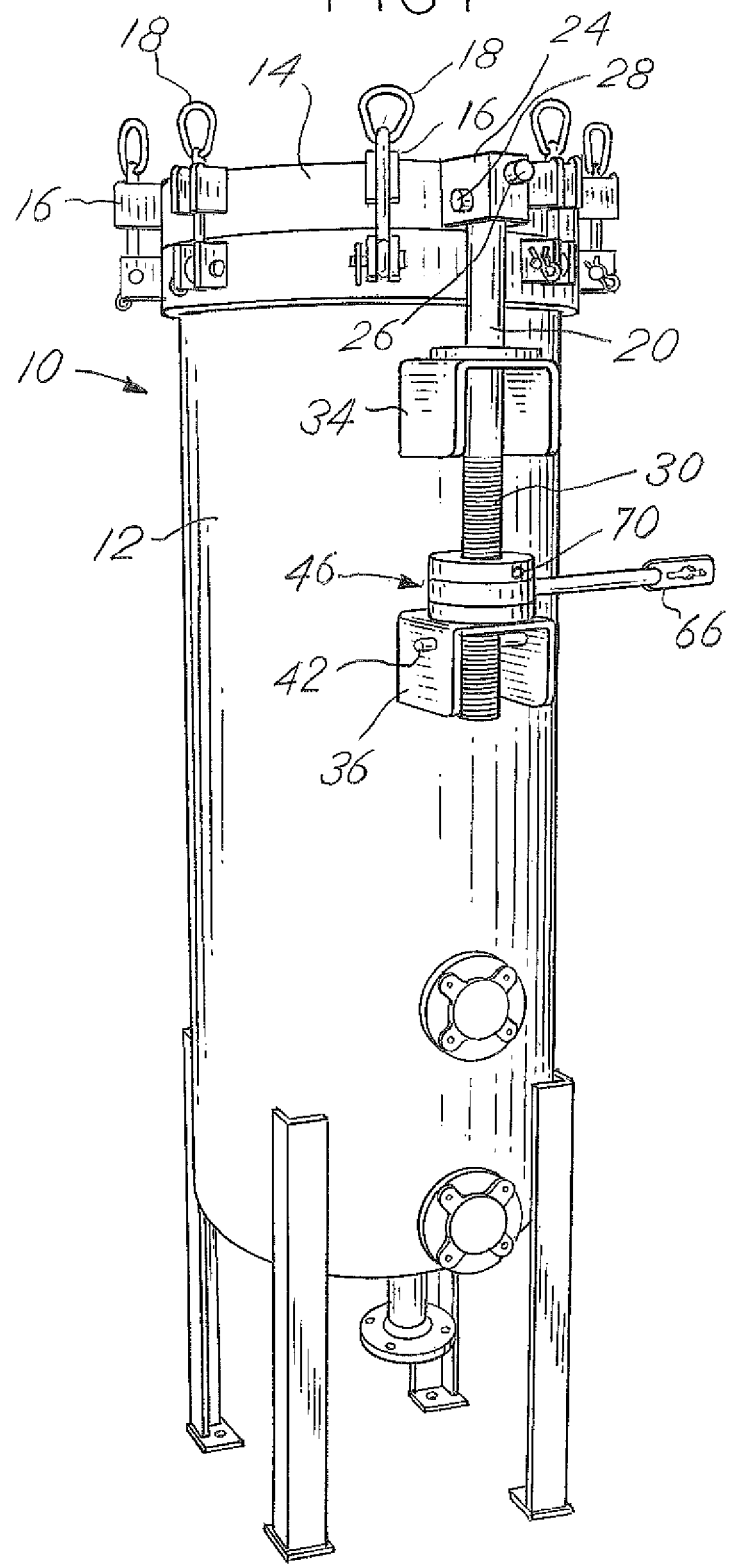
FIG. 1 is a perspective view of a first embodiment of the filter housing.

The filter housing 10 of the present invention has a vessel portion 12 and a lid 14 that is sealingly matable to the vessel portion 12. The lid 14 is typically made of steel and, depending on the size of the housing, can be extremely heavy. The lid has retainer brackets 16 around the periphery that are designed to accept clamps 18 that are used to secure the lid 14 to the vessel portion of the housing 10 when it is in use. The lid has an arm 20 that is secured to a mounting bracket 24 on the lid 14. The arm 20 may be joined to the bracket 24 by use of a press fit and bolt, or may be mounted with a bolt 26 and/or pin 28. The arm 20 and lid 14 are movable relative to the vessel portion 12 and both move together. The arm 20 is typically made of steel pipe and has an inclined feature.

Figure 5:
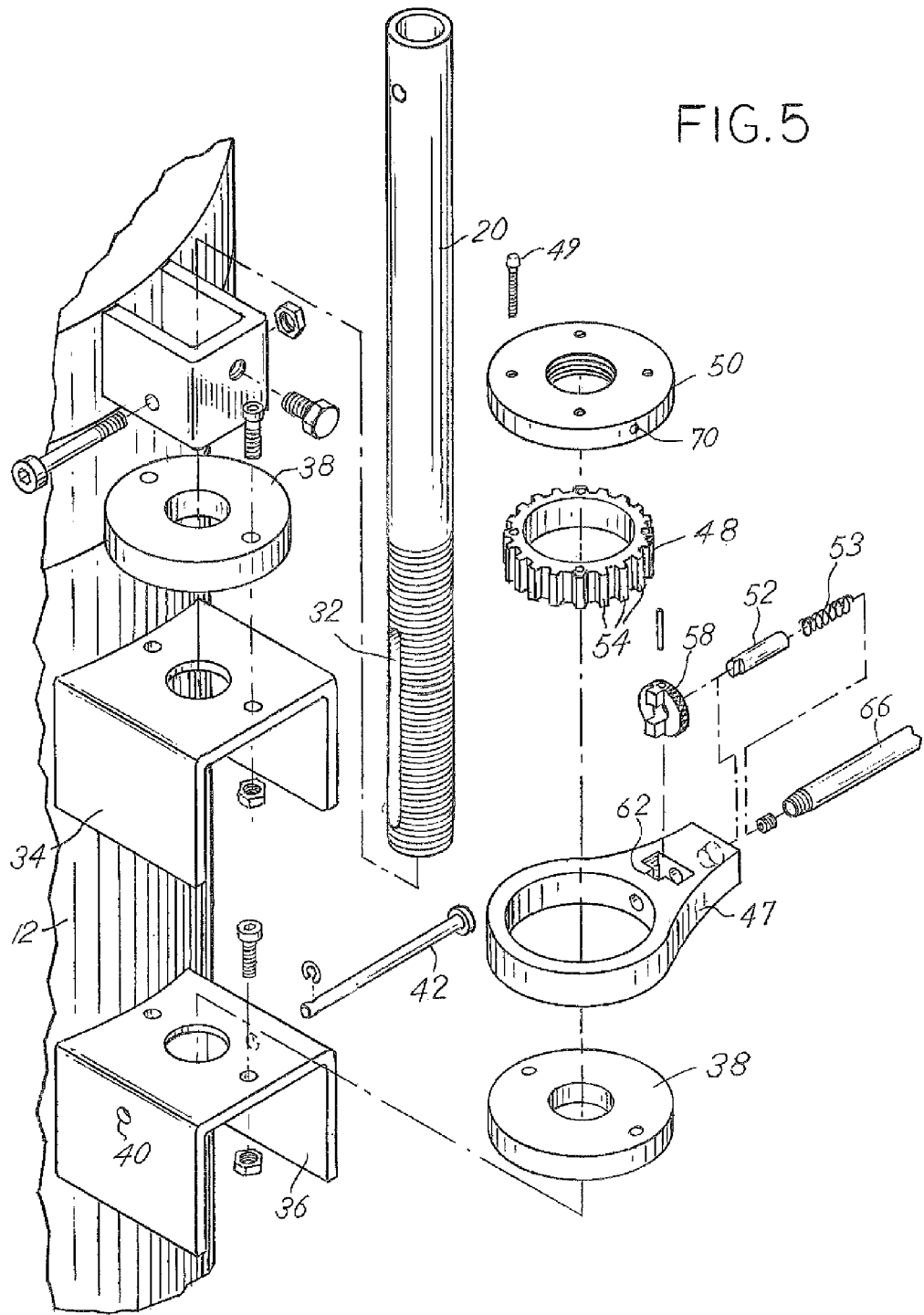
FIG. 5 is an exploded perspective view of the filter housing shown in FIGS. 1-4.

In one embodiment of the invention, the inclined feature on the arm 20 is threads 30. The threads 30 extend along a lower portion of the arm 20, as shown in FIG. 1. The arm 20 includes antirotation slots 32 within the threaded portion of the arm 20 that are best seen in FIG. 5. The arm 20 is held adjacent to the vessel portion 12 by upper and lower brackets 34, 36. The upper and lower brackets 34, 36 are welded to the side of the vessel portion 20 and have bushings 38 fastened to their upper surfaces as can be seen in FIGS. 2-4. The bushings 38 have an inner diameter that accepts the arm 20 and allows movement of the arm 20 within the bushings 38. Thus, longitudinal and rotational movement of the arm 20 is possible with respect to the vessel portion 12. The lower bracket 36 has holes 40 on both sides for accepting a removable antirotation pin 42. The antirotation pin 42 is removable and also extends through the antirotation slots 32 within the arm. The exploded view shown in FIG. 5 illustrates how these parts are assembled. Thus, the antirotation pin 42 provides a selective locking of the arm 20 with respect to the vessel portion 12.

A rotational member 46 rests against the bushing 38 on the lower bracket, as shown in FIG. 1. The rotational member 46 includes a ratchet housing 47 that contains a ratchet gear 48. The ratchet gear 48 has a threaded bushing 50 that is mounted to the ratchet gear 48 with bolts 49. The threaded bushing 50 has internal threads that match the threads 30 on the arm 20. The ratchet housing 47 includes a reversible spring loaded pawl 52. A spring 53 urges the pawl 52 into teeth 54 on the ratchet gear 48. FIG. 6 shows how the pawl 52 is angled to catch within the teeth 54 in one direction and slide over the teeth 54 in the opposite direction. A knurled thumb wheel 58 is attached to the pawl 52 and has a rib 60 for engaging a notch 62 in the ratchet housing 47. When the wheel is turned 180 degrees, the direction of the pawl 52 is reversed and, as can be seen by one skilled in the art, the direction the ratchet gear 48 will turn will be reversed. A handle 66 extends from the ratchet housing 47.

When the handle 66 is used to turn the ratchet housing 47 with the pawl 52, as shown in FIG. 6, the ratchet gear 48 and threaded bushing 50 will be rotated in a clockwise direction as viewed in FIG. 6. When the antirotation pin 42 is installed in the lower bracket 36, the arm 20 will be prevented from rotating, but will be able to move longitudinally. Rotating the ratchet housing 47 in a ratcheting motion will move the entire rotational member 46 downward on the arm 20. Thus, the arm 20 will be urged upward because the rotational member 46 rests against the lower bracket 36 that is fixed to the vessel portion 12.

The antirotation pin 42 may be removed from the lower bracket 36 and inserted within an aperture 70 in the threaded bushing 50. When the aperture 70 in the treaded bushing 50 is aligned with the antirotation slots 32, as shown in FIG. 3, the antirotation pin 42 can be inserted through the antirotation slots 32 and the aperture 70. This locks the threaded bushing 50 and ratchet gear 48 together. As such, when the handle 66 is rotated counterclockwise from its position in FIG. 3, to its position shown in FIG. 4, the lid will be turned ninety degrees.

In another embodiment, the inclined feature on the arm 70 is inclined slots 72 on opposite sides. The slots 72 have inclined portions 74 and flat portions 76 that are not inclined. The middle of the flat portion 76 of each slot 72 is approximately ninety degrees from the top 73 of the inclined slot 72. Locking holes 77 are located below the slots 72. As will become apparent from the foregoing description, only one locking hole 77 is needed, but for symmetry and manufacturability two locking holes 77 are included 180 degrees opposite each other in the arm 70. FIG. 7 shows an exploded view of the arm 70 in relation to the vessel portion 12. As in the previous embodiment, bushings 38 are mounted on the upper and lower brackets 34, 36. The arm 70 also has antirotation slots 80 that accept an antirotation pin 82. The antirotation pin 82 is held fixed with respect to the vessel portion 12 through the holes 40 in the lower bracket 36 and may be removed. The rotational member 86 has a central aperture 87 through which the arm 70 of this embodiment passes. A locking pin 88 is biased into the central aperture 87 with a spring 90. A retraction tab 91 is connected to the locking pin 88 and, when it is pulled in a direction away from the central aperture 87, the locking pin 88 is retracted. A lift pin 92 having a head 93 extends across the central aperture 87 and is received within the inclined slots 72. A handle 94 extends from the rotational member 86.

FIGS. 8-10 show various positions of the parts connected to the arm 70. Angular position in these FIGS. are shown as labeled with zero degrees being the position of the handle 94 in FIG. 8, ninety degrees being the position of the handle 94 in FIG. 9, and 180 degrees being the position of the handle 94 in FIG. 10. Movement of the handle 94 through these positions moves the arm 70 and therefore raises the lid 14 and is best explained by discussing the positions of the various parts connected to the arm 70 in the positions mentioned above.

In FIG. 8, with the handle 94 in the zero degree position, the head 93 of the lift pin 92 is at ninety degrees, and the top 73 of the inclined slot 72 is at ninety degrees. In this position, the antirotation pin 82 is in place in the lower bracket 36 and extends through the antirotation slots 80. The antirotation slots 80 are aligned across the zero and 180 degree positions.

As the handle is turned clockwise, as viewed from above from the position in FIG. 8 to the position in FIG. 9, the lift pin 92 rotates and the arm 70 remains locked due to the antirotation pin 82. As the lift pin 92 is rotated by movement of the handle 94, the lift pin 92 moves down the incline and raises the arm 70 as the rotational member 86 presses against the bushing 38 on the lower bracket 36. The motion of the handle 94 from zero to ninety degrees raises the arm until the lift pin 92 reaches the flat portions 76 of the slots 72. At the ninety degree position of the handle 94, as shown in FIG. 9, the locking pin 88 is urged into the locking hole 77 and the lid 14 is raised to its maximum height above the vessel portion. The locking hole 77 on the opposite side will never be positioned to receive the locking pin 88 but, as previously mentioned, for symmetry and manufacturability purposes an opposite locking hole 77 is included. This means an assembler installing the arm 70 will not have to check for the locking hole 77 to be located at the ninety degree position during assembly as long as the slots 72 and 80 are correctly positioned.

With the locking pin 88 in the locking hole, as is the case in the ninety degree position of the handle shown in FIG. 9, the antirotation pin 82 may be removed from lower bracket 36. When this is done, moving the handle from the ninety degree position to the 180 degree position, shown in FIG. 10, will rotate the lid 14 and arm 70 ninety degrees.

When a user of the filter housing 10 of this invention wishes to raise the lid 14, made according to the embodiment shown in FIGS. 1-5, he will move the handle 66 in a ratcheting motion until the lid 14 is raised to a desired height. With the lid 14 in the raised height, the user will ratchet the handle 66 until the aperture 70 in the threaded bushing 50 is aligned with the antirotation slots 32. He will then pull the antirotation pin 42 from the lower bracket 36 and insert it through the aperture 70 and through the antirotation slots 32. He will turn the handle 66 and rotate the lid. After the user has changed filter elements in the vessel portion 12 of the housing 10, he will use the handle 66 to rotate the lid 14 to a position directly over the vessel portion 12. In that position, the user will then remove the antirotation pin 42 from the aperture 70 and install it into the lower bracket 36 through the holes 40 in the lower bracket 36 and the antirotation slots 32. The user pulls back the thumb wheel 58 to dislodge the rib 60 from the notch 62 and rotate it 180 degrees so that the rib 60 is again in the notch 62. This will cause the pawl 52 to be facing the opposite direction from that shown in FIG. 6. Thus, moving the handle 66 will rotate the threaded bushing counterclockwise, as viewed from above, and lower the lid 14. Once the lid 14 is lowered, the clamps 18 are tightened against the lid as shown in FIG. 1.

A user raising the lid 14 on a housing 10 made according to the embodiment shown in FIGS. 7-10 will begin with the handle 94 in the zero degree position shown in FIG. 8. The user will then rotate the handle 94 toward the ninety degree position shown in FIG. 9. At the ninety degree position the locking pin 88 will engage into the locking hole 77 in the arm 70. With the handle 94 in the ninety degree position, the user will remove the antirotation pin 82 from the lower bracket 36. The user will move the handle from the ninety degree position to the 180 degree position and this will turn the lid 14 ninety degrees. To lower the lid 14, the user will rotate the handle from the 180 degree position to the ninety degree position shown in FIG. 9. In this position, he will reinstall the antirotation pin 82 in the lower bracket 36. The user will pull the retraction tab 91 toward the handle 94 to pull the locking pin 88 from the locking hole 77. While holding the retraction tab 91 he will rotate the handle 94 slightly before releasing the tab 91 so the locking pin 88 does not reengage the locking hole 77. As the handle 94 is rotated from ninety degrees to the zero degree position shown in FIG. 8, the lid 14 will be lowered to rest on the top of the vessel portion 12 of the housing 10. The clamps 18 are then tightened against the lid 14.

The invention is not limited to the details given above, but may be modified within the scope of the following claims.

What is claimed is:

1. A filter housing comprising:
   a vessel portion;
   a lid being sealingly matable to said vessel portion;
   an arm secured to said lid and movably engaged with said vessel portion, said arm including a slot for receiving a pin that is selectively fixed with respect to said filter housing, said slot being substantially aligned with a longitudinal axis of said arm for a portion of its length, said arm including external threads; and a rotational member for having a threaded part including threads for engaging said threads on said arm, said rotational member rotatable with respect to said vessel portion and restrained from longitudinal movement with respect to said vessel portion, so that rotation of said rotational member relative to said arm causes longitudinal movement of said arm and separation of said lid from said vessel portion, whereby said pin riding in said slot restricts rotational movement of said arm with respect to said housing when said pin is fixed with respect to said vessel portion, said pin being insertable through said rotational member and through said slot, so that said rotational member may impart rotation of said arm with respect to said vessel portion.

2. A filter housing as claimed in claim 1, wherein said rotational member includes a ratcheting mechanism including a pawl for catching teeth on a ratcheting gear for rotating said threaded part.

3. A filter housing as claimed in claim 2, wherein said arm includes a pair of slots on opposite sides of said arm, said pin being insertable through both slots, said rotational member including a pair of holes on opposite sides through which said pin may be selectively inserted to facilitate rotation of said arm when said pin is in said holes of said rotational member and in said slots.

4. A filter housing as claimed in claim 2, wherein said ratcheting mechanism includes a reversible pawl providing a ratcheting rotary motion of said ratchet gear in both directions.

* * * * *